O. DAHL.
PACKING BOX.
APPLICATION FILED MAR. 1, 1920.
1,387,690.
Patented Aug. 16, 1921.
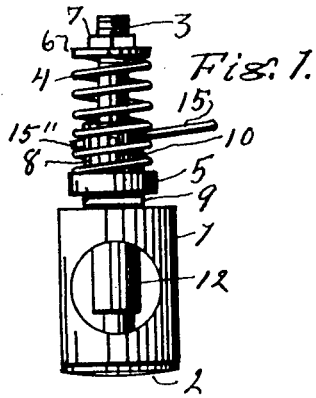
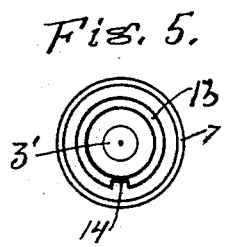
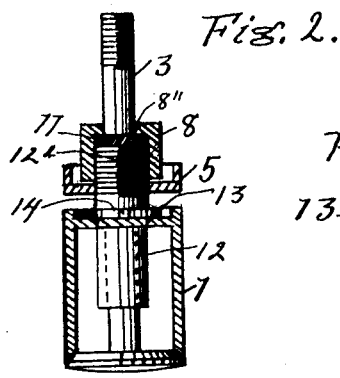
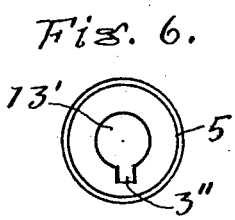
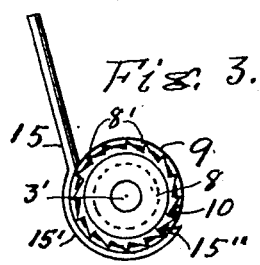
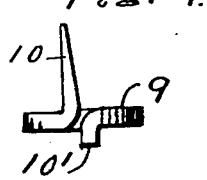
Inventor
Ole Dahl
By _____
Attorney ated Aug. 16, 1921.

UNITED STATES PATENT OFFICE.

OLE DAHL, OF MUSKEGON, MICHIGAN.

PACKING-BOX.

1,387,690.

Specification of Letters Patent. Patented Aug. 16, 1921.

Application filed March 1, 1920. Serial No. 362,634.

*To all whom it may concern:*

Be it known that I, OLE DAHL, a citizen of the United States, residing at Muskegon, in the county of Muskegon and State of Michigan, have invented certain new and useful Improvements in Packing-Boxes, of which the following is a specification.

My invention relates to improvements in packing boxes for use in positions where it is necessary to have a valve actuating spring surrounding them, and its objects are: first, to provide a means whereby the box may be easily adjusted without removing the spring; second, to provide a means whereby the packing box is temporarily locked in place; third, to provide a means whereby the locking element may be held safely in place and yet is susceptible of easy adjustment, or of being easily removed and replaced.

I attain these objects by the mechanism and construction of parts shown in the accompanying drawing, in which Figure 1 is an elevation of a valve, valve barrel and valve stem and spring complete but detached from an internal combustion engine. Fig. 2 is a vertical section of the same with the actuating spring and the anchoring element removed, the packing box being, also, shown in section. Fig. 3 is a plan of the upper part of the valve with the spring removed and the adjusting element in place to illustrate how the packing box may be adjusted. Fig. 4 is an elevation of the anchoring element disconnected from the valve. Fig. 5 is a plan of the upper end of the valve barrel, and Fig. 6 is a plan of the spring supporting washer.

Similar numerals indicate similar parts throughout the several views.

In the accompanying drawing 1 represents the valve barrel; 2 is the valve; 3 is the valve stem; 4 is the actuating spring that holds the valve securely seated; 5 is the lower spring support; 6 is the upper spring support; 7 is the adjusting nut; 11 is the packing to be acted upon by this box, 12 and 12' are the bearings that support and steady the valve stem 3, all of which are common in this class of valves. My invention consists of the peculiar form and construction of the packing box 8, which is designed to screw upon the bearing 12' to make the packing 11 effective to prevent the escape of gases around the valve stem 3. For the purpose of rendering this packing box perfectly available for adjustment without removing the spring 4 I form its periphery into a number of serrations or teeth 8' so arranged that they may be operated upon at any point the entire length of the box, to revolve the box and screw it onto the bearing 12' without the necessity of removing or in any way displacing the spring 4.

While there is no danger of the packing box becoming accidentally screwed farther upon the bearing than desired, there is danger that it might become unscrewed from, or partly from the bearing, and to avoid this I make an anchoring element of spring metal, consisting of a ring or body part 9 having an upwardly extending arm 10 that is designed to pass through the slot 3'' in the support 5, and to lie against the box 8 back of one of the teeth 8', as indicated in Fig. 1 and Fig. 3, and the lug 10' is designed to engage the notch 14 in the rim 13 on the valve barrel, so the arm 10 cannot be carried around with the box 8 when revolving the box to press more heavily upon the packing 11.

The implement I supply for adjusting the box 8 consists of a handle 15 having a curved arm 15' thereon that should have an inside curvature corresponding with the peripheral circle of the box, and has a hook or lug 15'' for engaging the teeth 8' on the box. This wrench should be so constructed that it may be placed between any two coils of the spring 4 and engage the teeth 8', as indicated in Fig. 1.

3' indicates the opening in the valve barrel 1 and the packing box 8 for the passage of the valve stem 3, and 13' indicates the opening in the support 5 for the passage of the bearing 12'. 8'', in Fig. 2, indicates a countersink in the packing box for retaining a few drops of oil when oiling the valve rod 3.

It is a well known fact that with the ordinary packing box of this class the suction of the in stroke of the piston is likely to cause a very strong passage of air into the box, around the piston rod 3. With my device I am able to so adjust the packing as to wholly avoid this difficulty, as well as to prevent the escape of gas upon the force stroke of the piston.

What I claim as new in the art, is:

1. A packing box having serrations upon its periphery, and an anchoring element consisting of an annular body open at one side, a right angled spring arm projecting upwardly from one side of the opening in the body and engaging the serrations and so anchored as to prevent the box from unscrewing from its bearings and arranged to allow the box to be screwed farther into the barrel if desired.

2. In a packing box a valve barrel having a rim that is notched to receive one arm of an anchoring element, a spring support having a notch designed to receive another arm of the anchoring element, a packing box having serrations longitudinally of its outer surface, and an annular anchoring element having a right angled stationary arm at one end made to engage the notch in the rim, and a right angled spring arm extending from the opposite side of the body of the anchoring element in position to engage the notch in the spring support and to contact with the serrations on the valve body and hold the body in desired position.

3. In combination with a valve, a valve stem having an actuating spring and spring supports therefor, a bearing for said valve stem, a packing box adapted to screw upon said bearing, longitudinal serrations on said box, an anchoring element having an annular body surrounding said bearing, an integral arm extending upwardly from said body through one of said spring supports and resting back of one of said serrations, and a lug on said element engaging said bearing, and an implement for engaging the serrations and adjusting the packing box without removing the actuating spring.

Signed at Muskegon, Michigan, February 14, 1920.

OLE DAHL.